(12) United States Patent
Griffin

(10) Patent No.: US 10,368,055 B2
(45) Date of Patent: *Jul. 30, 2019

(54) ACTOR-MOUNTED MOTION CAPTURE CAMERA

(71) Applicant: TWO PIC MC LLC, Burbank, CA (US)

(72) Inventor: Doug Griffin, Parker, CO (US)

(73) Assignee: Two Pic MC LLC, Burbank, CA (US)

(*) Notice: Subject to any disclaimer, the term of this patent is extended or adjusted under 35 U.S.C. 154(b) by 272 days.

This patent is subject to a terminal disclaimer.

(21) Appl. No.: 15/134,297

(22) Filed: Apr. 20, 2016

(65) Prior Publication Data

US 2016/0234478 A1 Aug. 11, 2016

Related U.S. Application Data

(63) Continuation of application No. 12/240,907, filed on Sep. 29, 2008, now Pat. No. 9,325,972.

(51) Int. Cl.
*H04N 13/398* (2018.01)
*H04N 13/254* (2018.01)
(Continued)

(52) U.S. Cl.
CPC ........... *H04N 13/254* (2018.05); *A45C 11/16* (2013.01); *G06K 9/00255* (2013.01);
(Continued)

(58) Field of Classification Search
CPC ..... G06K 9/00255; G06T 7/246; A45C 11/16; G06Q 10/103
(Continued)

(56) References Cited

U.S. PATENT DOCUMENTS 4,797,736 A 1/1989 Kloots et al.
6,020,892 A 2/2000 Dillon
(Continued)

FOREIGN PATENT DOCUMENTS

WO WO-2008040918 A2 * 4/2008 ........... H04N 13/122

OTHER PUBLICATIONS

U.S. Appl. No. 12/240,907, "Notice of Allowance", dated Dec. 16, 2015, 5 pages.
(Continued)

*Primary Examiner* — Kyung H Shin
(74) *Attorney, Agent, or Firm* — Kilpatrick Townsend & Stockton LLP

(57) ABSTRACT

The present invention relates to computer capture of object motion. More specifically, embodiments of the present invention relate to capturing of facial movement or performance of an actor. Embodiments of the present invention provide a head-mounted camera system that allows the movements of an actor's face to be captured separately from, but simultaneously with, the movements of the actor's body. In many embodiments, multiple cameras are provided mounted on a bracket for placement on the head of an actor. In some embodiments, the cameras record grayscale images of an actor's face, which has been marked with dots of makeup. In many embodiments, the cameras record images of an actor's face from at least two angles.

20 Claims, 9 Drawing Sheets

(51) Int. Cl.
  *H04N 13/243* (2018.01)
  *H04N 13/275* (2018.01)
  *G06K 9/00* (2006.01)
  *A45C 11/16* (2006.01)
  *H04N 7/18* (2006.01)
  *G01S 3/786* (2006.01)
  *H04N 5/232* (2006.01)
  *G06T 7/246* (2017.01)
  *G06Q 10/10* (2012.01)

(52) U.S. Cl.
  CPC ......... *H04N 13/243* (2018.05); *H04N 13/275* (2018.05); *H04N 13/398* (2018.05); *G01S 3/7864* (2013.01); *G06Q 10/103* (2013.01); *G06T 7/246* (2017.01); *H04N 5/232* (2013.01); *H04N 7/181* (2013.01)

(58) Field of Classification Search
  USPC ........................................................ 705/301
  See application file for complete search history.

(56) References Cited

U.S. PATENT DOCUMENTS

| | | | |
|---|---|---|---|
| 6,121,953 | A | 9/2000 | Walker |
| 6,578,967 | B1 | 6/2003 | Paddock et al. |
| 7,218,320 | B2 | 5/2007 | Gordon et al. |
| 7,333,113 | B2 | 2/2008 | Gordon |
| 7,358,972 | B2 | 4/2008 | Gordon et al. |
| 7,388,971 | B2 | 6/2008 | Rice et al. |
| 7,401,920 | B1 | 7/2008 | Kranz et al. |
| 2004/0155968 | A1 | 8/2004 | Cheatle et al. |
| 2005/0105772 | A1 | 3/2005 | Voronka et al. |
| 2005/0257748 | A1 | 11/2005 | Kriesel et al. |
| 2006/0071934 | A1 | 4/2006 | Sagar et al. |
| 2006/0146142 | A1 | 7/2006 | Arisawa et al. |
| 2007/0047768 | A1* | 3/2007 | Gordon .............. G06K 9/00255 382/103 |
| 2007/0058839 | A1 | 3/2007 | Echegaray et al. |
| 2007/0229660 | A1 | 10/2007 | Yamaguchi |
| 2008/0025569 | A1 | 1/2008 | Gordon et al. |
| 2008/0136916 | A1 | 6/2008 | Wolff |
| 2009/0094046 | A1* | 4/2009 | Hyman .................. A45C 11/16 705/301 |
| 2011/0102558 | A1* | 5/2011 | Moliton ............... H04N 13/398 348/54 |

OTHER PUBLICATIONS

U.S. Appl. No. 12/240,907, "Office Action", dated Dec. 29, 2011, 18 pages.
U.S. Appl. No. 12/240,907, "Office Action Response", dated Feb. 29, 2012, 12 pages.
EP09817042.6, "Extended European Search Report", dated Nov. 29, 2012, 10 pages.
Woodward, A., et al., "Low cost virtual face performance capture using stereo web cameras," Dec. 17, 2007, Advances in Image and Video Technology; Lecture Notes in Computer Science, Springer Berlin Heidelberg, pp. 763-776.
Supplementary Search Report dated Nov. 16, 2012, European Application No. EP09817042. 7 pages.
International Search Report dated Nov. 20, 2009 for International Application No. PCT/US09/58820, filed Sep. 29, 2009.
International Search Report dated Dec. 2, 2009 for International Application No. PCT/US09/58848, filed Sep. 29, 2009.
International Search Report dated Nov. 20, 2009 for International Application No. PCT/US09/58824, filed Sep. 29, 2009.

* cited by examiner

ACTOR-MOUNTED MOTION CAPTURE CAMERA

CLAIM OF PRIORITY

The present application is a continuation of, and claims benefit and priority to U.S. application Ser. No. 12/240,907, filed Sep. 29, 2008, entitled "ACTOR-MOUNTED MOTION CAPTURE CAMERA," the contents of which is hereby incorporated by reference for all purposes.

CROSS-REFERENCE TO RELATED APPLICATIONS

The present invention is related to U.S. application Ser. No. 12/240,928, filed Sep. 29, 2008, entitled "ASYNCHRONOUS STREAMING OF DATA FOR VALIDATION", to U.S. application Ser. No. 12/240,911, filed Sep. 29, 2008 (now U.S. Pat. No. 8,289,443), entitled "MOUNTING AND BRACKET FOR AN ACTOR-MOUNTED MOTION CAPTURE CAMERA SYSTEM", and to U.S. application Ser. No. 12/240,655, filed Sep. 29, 2008 (now U.S. Pat. No. 8,204,340), entitled "METHODS AND APPARATUS FOR DOT MARKER MATCHING," the entire contents of which are incorporated by reference herein for all purposes.

BACKGROUND OF THE INVENTION

The present invention relates to computer capture of object motion. More specifically, embodiments of the present invention relate to capturing of facial movement or performance of an actor.

Traditional computer animation of objects is determined by users known as animators. These animators are skilled artists who would specify movement of objects, such as people, within a computer environment. As a model for human movement, many animators often referred to how they moved, through the use of mirrors, video cameras, or the like.

Animation has also been based more directly upon physical movement of actors. This animation is known in the film industry as motion-capture or performance capture. In such cases, an actor is equipped with a suit with a number of markers, and as the actor moves, a number of cameras track the positions of the markers in space. This technique allows the actor's movements and expressions to be captured, and the movements and expressions can then be manipulated in a digital environment to produce whatever animation is desired.

One difficulty with prior motion capture techniques is that they often fail to produce high quality results with respect to capturing facial motion. Facial motion is very detailed and capturing the fine movements of an actor, or failing to do so, has a significant impact on the end product. Simply scaling current techniques to capture more markers is not practical as the data management, storage and processing capabilities are barely able to handle current marker density. High fidelity motion-capture, particularly video based data of the face, generates large volumes of digital data. Further, the fine-grain motion of the face is often lost in the noise inherent in stationary camera motion capture systems.

One solution to this problem has been to use separate and non-simultaneous face and body motion capture. A drawback to this approach is that it requires substantial duplication of effort by the actor and the crew, as each scene must be performed and captured at least twice. Another difficulty arises in that the actor's second performance may not correspond closely enough with the first, which affects the appearance and quality of the end result by making the correlation of the data from the multiple performances difficult.

Another solution is a simultaneous face and body motion capture using fixed position cameras and/or movable platform mounted cameras 100, such as is shown in FIG. 1. Capturing detailed facial motion generally involves tracking a large number of markers 140 placed on the actors' faces throughout a fixed capture volume 120, which is defined by the stationary motion capture cameras. In addition to the facial markers 140, markers 130 are placed on the actors' bodies, averaging a total of about 250 marker points per actor. For a scene with several actors, the total number of markers may be well over a thousand.

This abundance of markers creates a correspondingly large amount of data to be processed. It is sometimes difficult to accurately identify the markers associated with each actor 110 in a scene and obtaining sufficient resolution of the closely spaced facial markers 140 presents further complexities. In addition, because data from both the face and the body is captured together, it is necessary to process all of the data in order to determine whether sufficient facial motion data was recorded. Similarly, feedback cannot be given to the director or actor regarding the overall movement in the scene until all of the data has been processed. Waiting for the combined facial and body data to be processed significantly increases the delay between the initial capture and any reshoots that are necessary, likely causing production and scheduling problems, as well as increasing costs.

Prior head-mounted cameras have had several obstacles, such as interfering with the performance of the actor, either due to the discomfort of wearing the device or from the mere presence of the device in front of the actor's eyes or mouth, or failing to capture images of an adequate portion of the face for quality reconstruction. In addition, prior head-mounted cameras experience difficulty in maintaining position or in repositioning the camera.

Accordingly, an improved system for capturing and processing facial motions of an actor that increases accuracy while minimizing processing time and difficulty is desired. In addition, it would be desirable to have a head-mounted camera that is unobtrusive to the actor, but is capable of imaging a substantial portion of the face, and is easily repositioned.

BRIEF SUMMARY OF THE INVENTION

The present invention relates to computer capture of object motion. More specifically, embodiments of the present invention relate to capturing of facial movement or performance of an actor. Embodiments of the present invention provide a head-mounted camera system that allows the movements of an actor's face to be captured separately from, but simultaneously with, the movements of the actor's body. In many embodiments, multiple cameras are provided mounted on a bracket for placement on the head of an actor. In some embodiments, the cameras record grayscale images of an actor's face, which has been marked with dots of makeup. In many embodiments, the cameras record images of an actor's face from at least two angles.

In a first aspect, embodiments of the present invention provide an external three-dimensional camera system configured to capture images. The camera system comprises a plurality of head-mounted cameras, where the cameras are configured to capture images of at least a portion of an actor's face from at least two different angles.

In some embodiments, the camera system includes at least two cameras. In some preferred embodiments, the camera system includes at least four cameras.

In many embodiments, the cameras are fixed in position such that they record images from the same angles with respect to the actor's face.

In some embodiments, the camera system also includes a processor that is configured to process image data from the head-mounted cameras. In some embodiments, the images may include marker data. In many embodiments, the head-mounted cameras are micro-cameras. In some embodiments the head-mounted cameras may be configured to record grayscale images.

In another aspect, embodiments of the present invention provide a motion capture camera system that includes a plurality of micro-cameras. The micro-cameras are configured to capture images of at least a portion of an actor's face from at least two different angles. A helmet is adapted to be positioned on an actor's head. A mounting bracket is connected to the helmet and the plurality of micro-cameras are positioned on the mounting bracket. A processor is connected to the micro-cameras and a transmitter is connected to the processor.

In some embodiments, the plurality of micro-cameras includes at least two cameras. In some preferred embodiments, the plurality of micro-cameras includes at least four cameras.

In some embodiments, the plurality of micro-cameras are fixed in position with respect to the mounting bracket.

In some embodiments, the transmitter is a wireless transmitter.

In some embodiments, the processor is configured to process image data from the plurality of micro-cameras to produce three-dimensional image data of the actor's face. The image data may include marker data.

In some embodiments, the motion capture camera system also includes a plurality of surface-mounted cameras. The surface-mounted cameras are configured to capture image data of an actor's body from at least two different angles. In some embodiments, the plurality of surface-mounted cameras are connected to the processor. The processor is configured to process image data from the plurality of surface-mounted cameras to produce three-dimensional image data of the actor's body.

In another aspect, embodiments of the present invention provide a method of motion capture of an actor's face. Marker dots are placed on the actor's face and a head-mounted camera system is positioned on the actor's head. The head-mounted camera system comprises a plurality of cameras. The plurality of cameras are configured to capture image data of the actor's face from at least two different angles. Images of the actor's face are acquired and transmitted to a processor. The images are processed to obtain three-dimensional image data of the actor's face.

In some embodiments, the captured image data includes marker data.

DETAILED DESCRIPTION OF THE INVENTION

Embodiments of the present invention relate to computer capture of object motion. Although embodiments make specific reference to capturing of facial movement or performance of an actor, the system methods and device described herein may be applicable to any application in which computer capture of fine movements is required.

Figure 2:
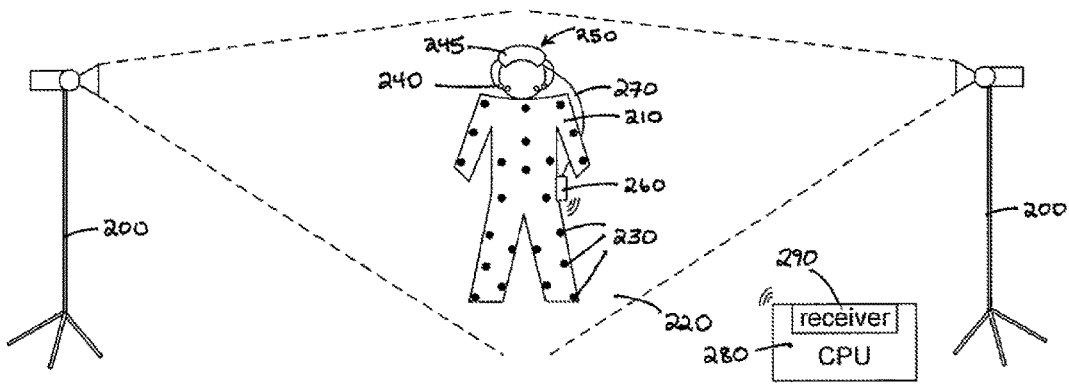
FIG. 2 shows a motion capture camera system according to an embodiment of the present invention.

FIG. 2 shows a motion capture camera system according to an embodiment of the present invention. A head-mounted motion capture camera system 250 is positioned on the actor's head for capturing data from the facial movement of the actor 210. The head-mounted camera system includes cameras 240 and a helmet 245. The cameras 240 are connected via cable 270 to a data logger 260, which is attached to the actor. The data logger 260 may be worn on a belt or otherwise as part of the actor's clothing to prevent the data logger from becoming disconnected during the actor's performance. The data logger 260 is in wireless communication with a processor 280 via a wireless receiver 290.

Figure 1:
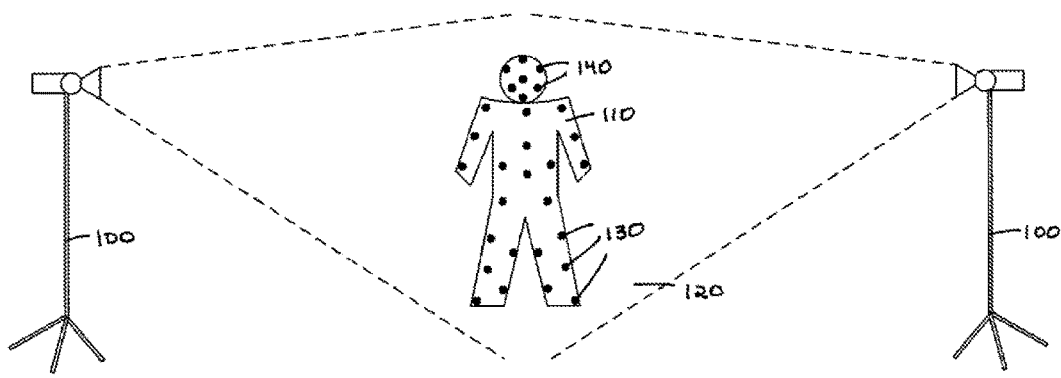
FIG. 1 depicts a prior art motion capture camera system.

For capturing the data from the body movement of an actor 210, the system in FIG. 2 is similar to that shown in FIG. 1. Fixed or platform-mounted movable cameras 200 are positioned around an actor 210, defining a capture volume 220. The cameras 200 capture images of the actor's movement using body markers 230.

Figure 3:
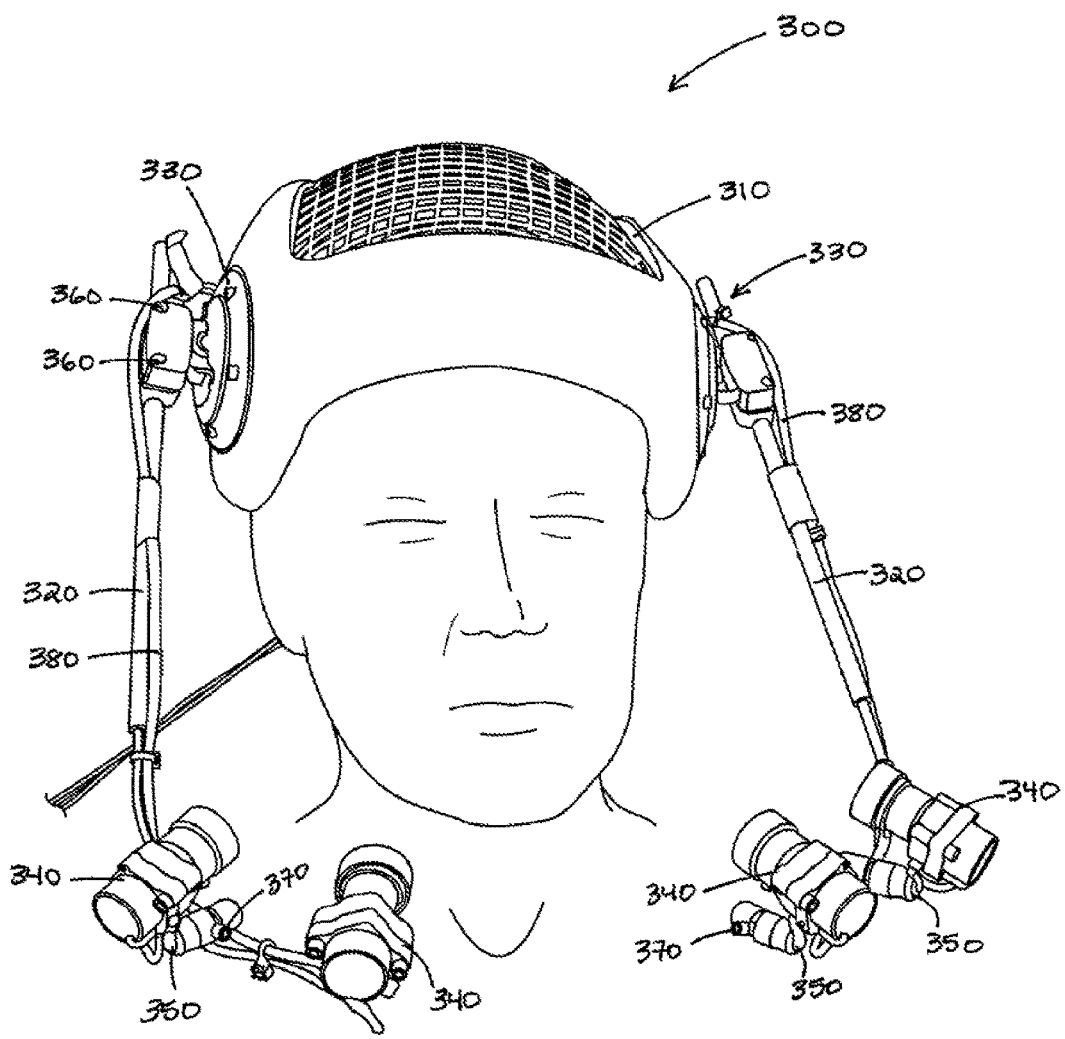
FIG. 3 shows a head-mounted camera system according to an embodiment of the present invention.

FIG. 3 shows one embodiment of a head-mounted motion capture camera system 300 in more detail. A helmet 310 is secured to the head of an actor. Mounting rods 320 are attached to the helmet 310 via universal joints 330. In some embodiments, the mounting rods 320 will be attached to the helmet 310 approximately above the temples of the actor. Mounted on the mounting rods 320 are cameras 340. The cameras 340 are secured to the mounting rods 320 with universally pivoting ball joints 350. The mounting rods 320 are preferably made from carbon fiber tubes and/or stainless steel to minimize weight, while maintaining the strength of the rods. Adjustment screws 360 and 370 are provided to adjust the orientation of the mounting rod 320 and cameras 340, respectively. The cameras 340 are connected via cables 380 to the data logger (not shown).

Figure 4:
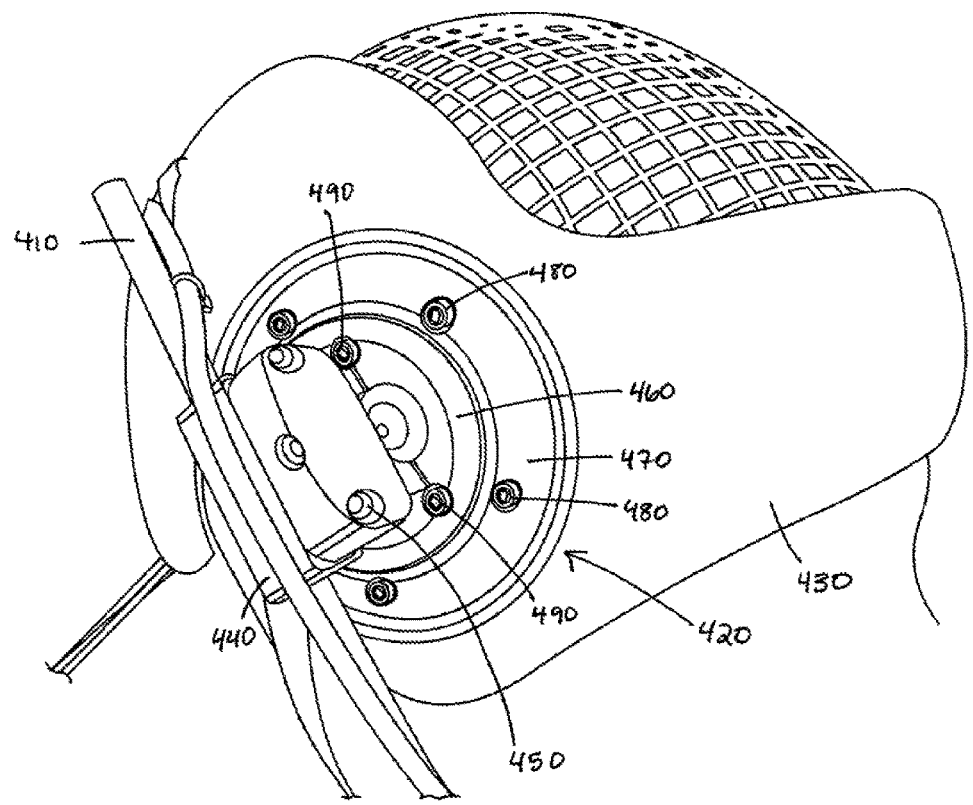
FIG. 4 depicts an enlarged view of a universal joint connecting a mounting rod and helmet.

In FIG. 4, an enlarged side view of an embodiment of a head-mounted motion capture camera system is shown. Mounting rod 410 is connected via a universal joint 420 to helmet 430. The universal joint includes a bracket 440, which holds the mounting rod 410 in a channel extending lengthwise through the bracket. Set screws 450 maintain pressure on the mounting rod 410 to hold it in position within the bracket 440. The bracket 440 is connected to an inner circular portion 460 of the universal joint 420. The inner circular portion 460 is positioned concentrically inside an outer circular portion 470. Outer circular portion 470 is affixed to the helmet 430 using screws 480. The outer circular portion 470 does not move with respect to the helmet and is preferably configured to affix to the helmet 430 in a singular orientation. Inner circular portion 460 is rotatable with respect to the outer circular portion 470, allowing one degree of freedom of movement for the mounting rod, such that its orientation may be adjusted to position the cameras (not shown) higher or lower in front of the actor's face. Set screws 490 are used to lock the inner circular portion 460 into a fixed position with respect to the outer circular portion 470.

Figure 5:
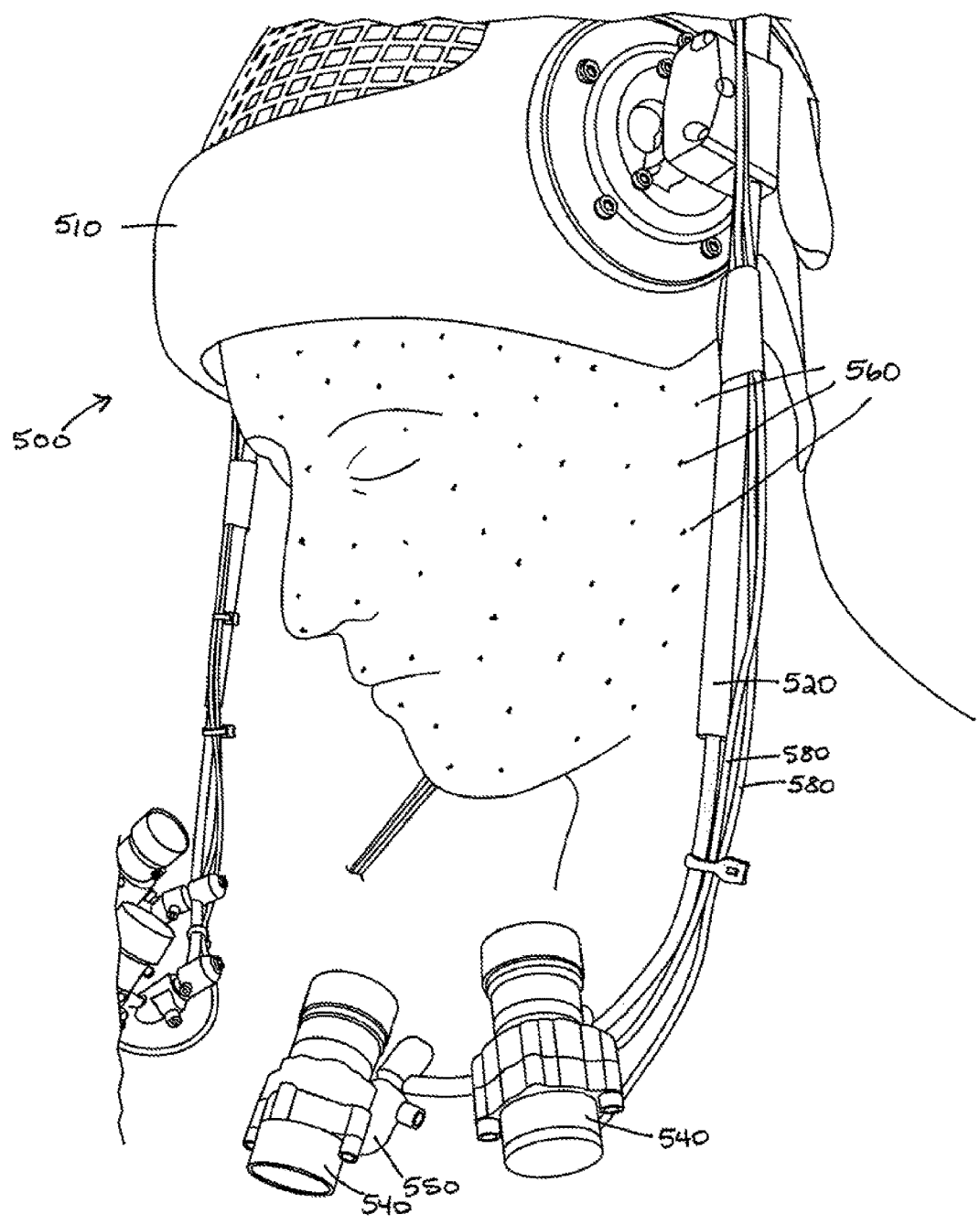
FIG. 5 shows a side view of an embodiment of a head-mounted motion capture camera system.

A side view of an embodiment of a head-mounted motion capture camera system 500 is shown in FIG. 5. Approximately 75 makeup dots 560 will be placed on the face of the actor. The makeup dots are not reflective and so are not captured by the fixed motion capture cameras described above (e.g. 100 in FIG. 1). Additionally, unlike the reflective markers used for tracking the body movements, the makeup dots are simple paint that can remain in place for an entire day, without needing to be replaced or repositioned. Cameras 540 are positioned on mounting rods 520. In a preferred embodiment, the camera system 500 has two mounting rods 520 and each mounting rod has two cameras 540 and the cameras 540 are machine vision micro-cameras. The cameras 540 record grayscale images of the actor's face, which are then used to track the movement of the face during post-processing.

The placement of the four cameras around the face allow for stereo reconstruction from both sides of the face because each side of the face is imaged from two different angles. In addition, the cameras move with the actor, keeping the relative position of each camera to the face the same, which minimizes the calculations necessary to identify and track the makeup dots 560 and to process the image data.

Figure 6:
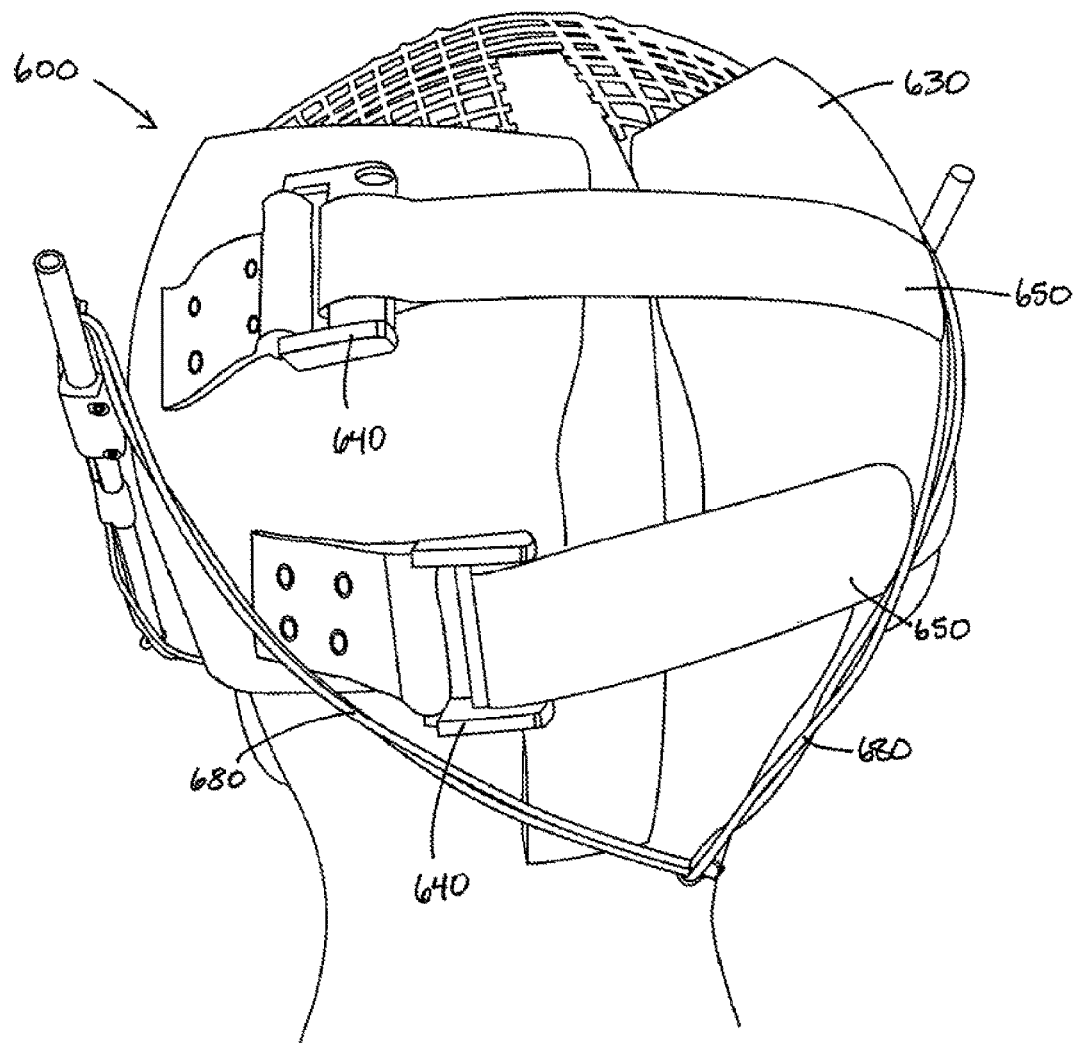
FIG. 6 shows a rear view of the head-mounted motion capture camera system.

FIG. 6 shows a view of the back of the head-mounted motion capture camera system 600. The helmet 630 may be secured to the head of the actor, for example by using buckles 640 with a hook-and-loop fastening material 650, a chin strap (not shown), or a pressurized custom fit. In a preferred embodiment, cables 680 are gathered at the back of the actor's head and then connected to the data logger (not shown) in order to minimize the chances of the actor becoming entangled by the cables or the cables becoming disconnected.

Figure 7A:
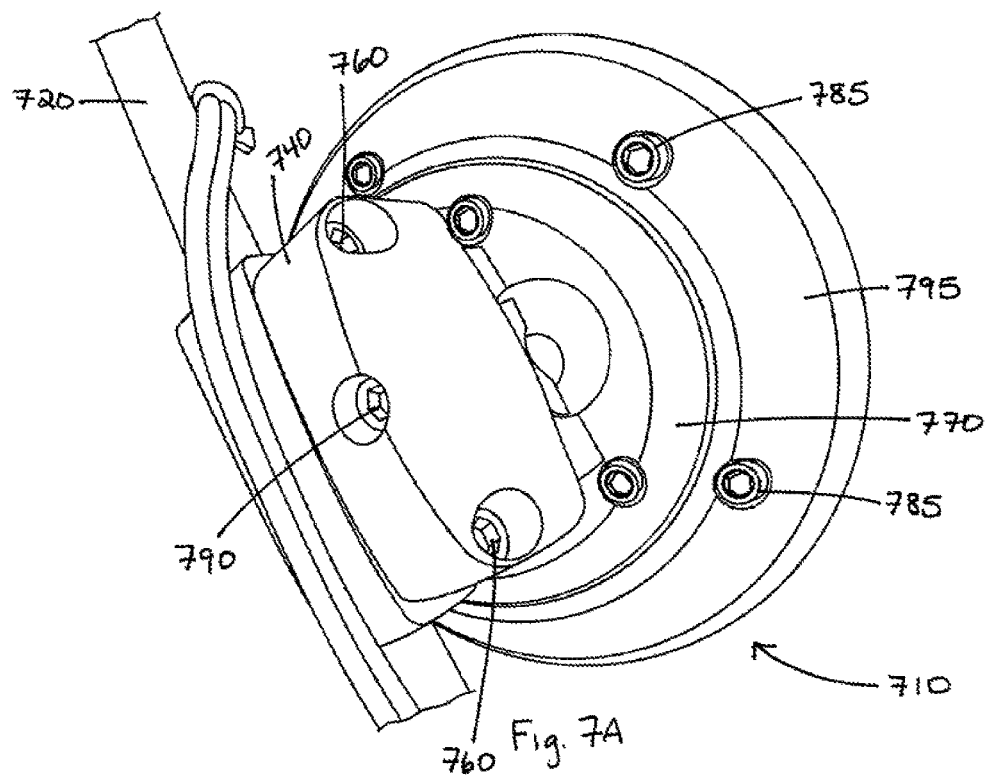
FIGS. 7A and 7B show enlarged views of a universal joint.
Figure 7B:
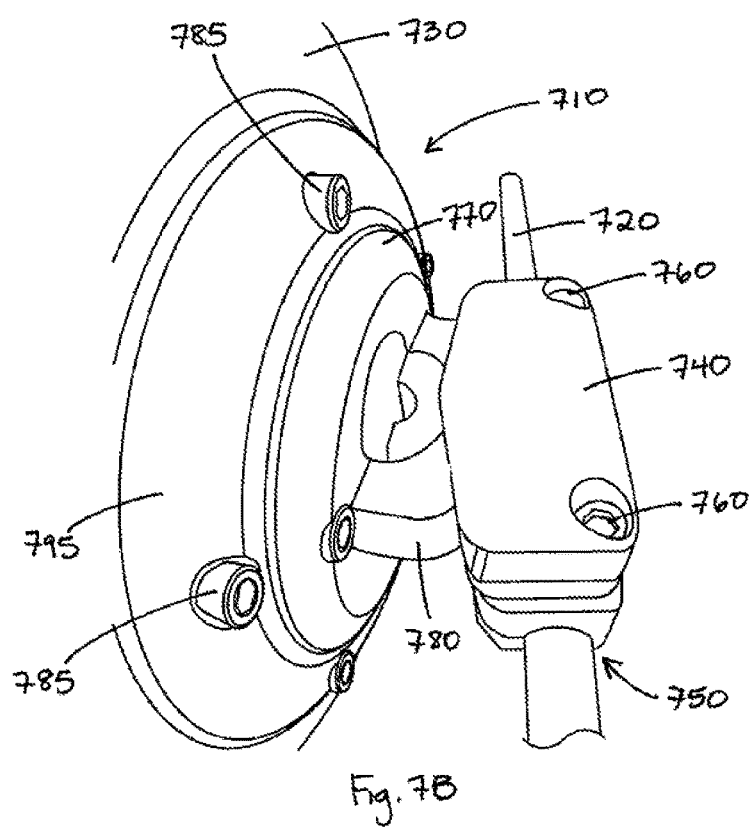
Figure 8A:
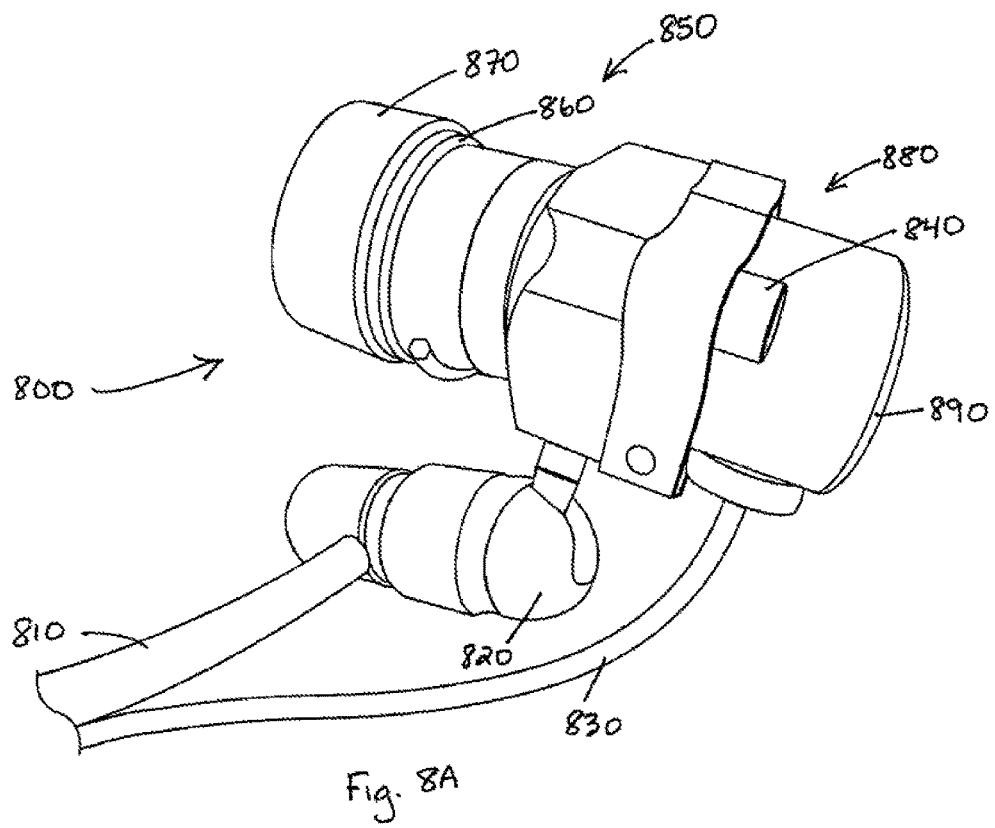
FIGS. 8A-8D show enlarged views of a camera and universally pivoting ball joint according to an embodiment of the invention.
Figure 8B:
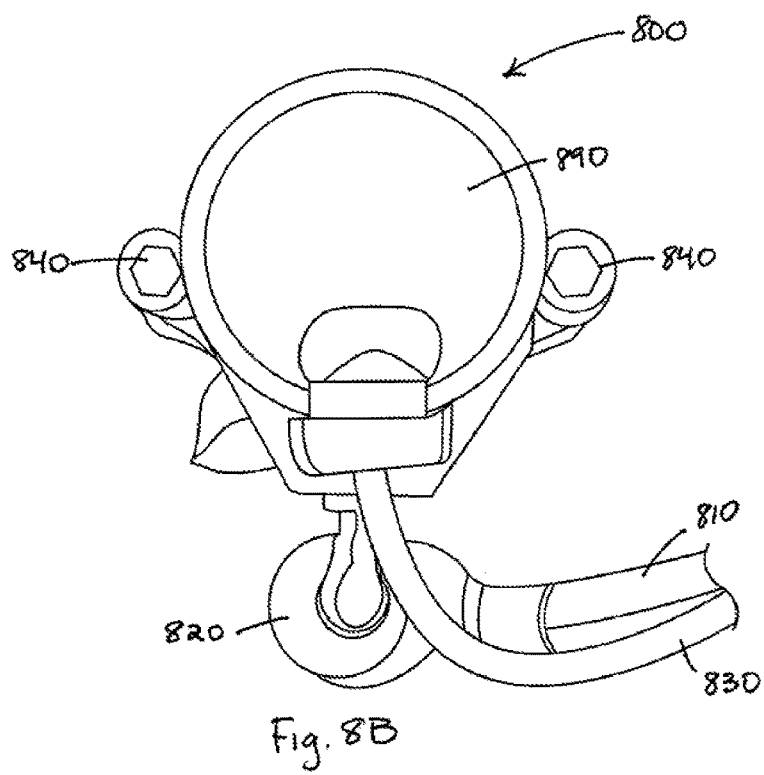
Figure 8C:
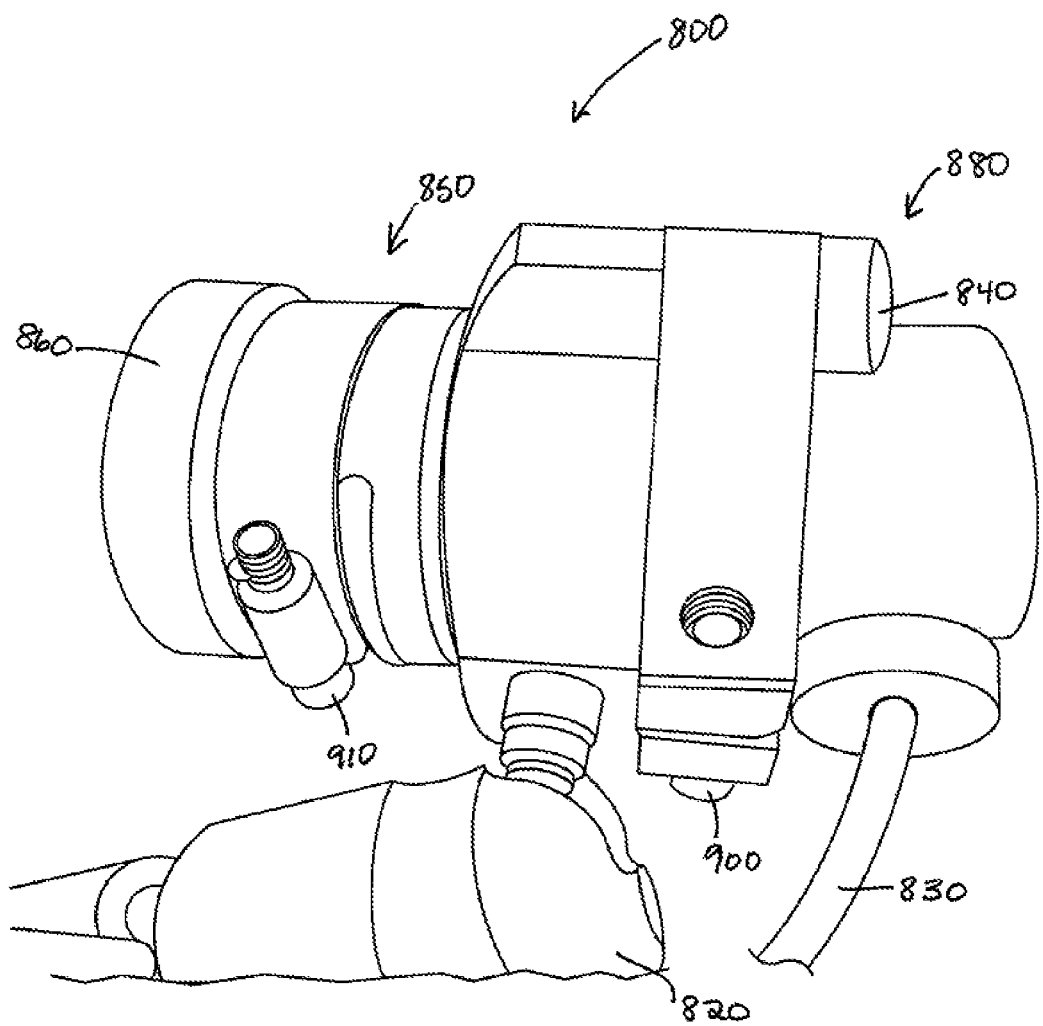
Figure 8D:
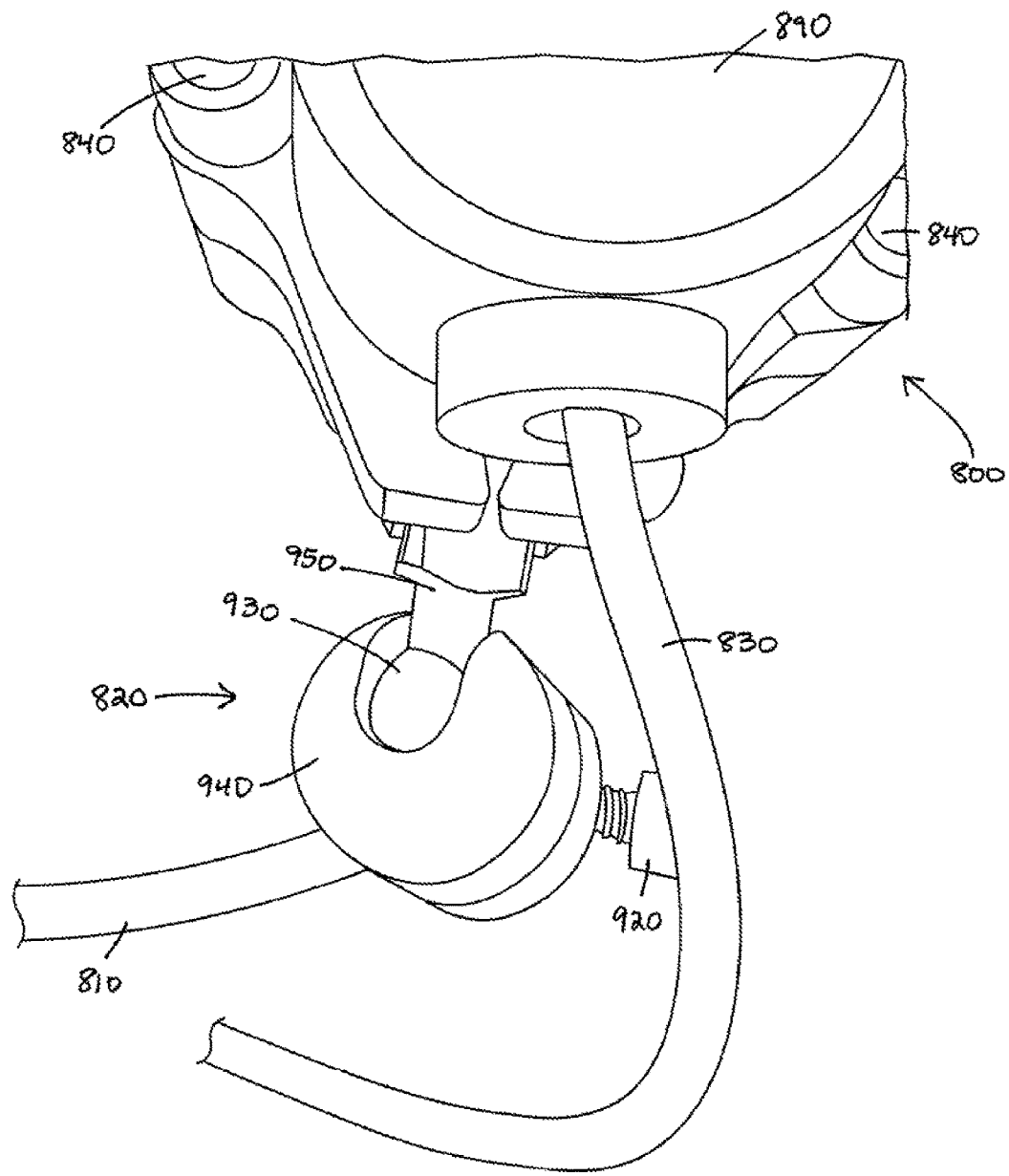

FIGS. 7A and 7B show additional views of an embodiment of the universal joint 710 that connects the mounting rod 720 to the helmet 730. Bracket 740 holds the mounting rod 720 in a channel 750 that runs through the length of the bracket. By loosening set screws 760, mounting rod 720 may be rotated around its axis and may be repositioned within the channel 750 to extend a greater or shorter distance from the bracket 740. The bracket 740 is attached to the inner circular portion 770 with connector 780, and the bracket may pivot on the connector to adjust the mounting rod 720 to be closer to or further from the actor's face. A set screw 790 is used to secure the bracket 740 in position with the connector 780.

The universal joint 710 provides a connection for the mounting rod that is both easily repositioned by simply loosening the appropriate set screws, and securely held in a fixed position when the set screws are tightened. When necessary, one of the mounting rods 720 may be removed from the helmet 730 by loosening screws 785 to remove the entire assembly from the helmet. This can be useful in scenes where an actor is required to hold an object near one side of his face, for example, or when he is required to rest his head on a surface, such as a pillow. After that portion of the performance has been captured, the mounting rod 720 and universal joint 710 assembly can be replaced in exactly the same position and orientation as it was previously arranged by reattaching the set screws 785. Because the outer circular portion 795 does not move with respect to the helmet 730, as discussed above, when it is placed on the helmet again with the screws, it will adopt its original orientation.

In FIGS. 8A-8D, enlarged views of a camera and universally pivoting ball joint according to an embodiment of the invention are shown. Camera 800 is attached to mounting rod 810 via a universally pivoting ball joint 820. The universally pivoting ball joint 820 comprises a ball 930 that fits inside a socket 940, which allows the camera to be oriented in a wide range of directions. The ball 930 of the ball joint 820 is connected via a stem 950 to the housing of the camera 800, while the socket 940 is connected to the mounting rod 810. Once an orientation is selected for the camera, based on the requirements of the actor's face or other considerations, the ball 930 may be locked into that position in the socket 940 using set screw 920.

Set screws 900 hold the camera 800 in place on the stem 950 of the universally pivoting ball joint 820. The camera 800 may be removed, for example to replace a defective or non-functioning camera, by simply loosening the set screws 900. It is not necessary to adjust the ball joint 820 or the mounting rod 810 to remove the camera, thus when a camera 800 (either the same or a different camera) is placed onto the ball joint 820, it will be in the same position and orientation as the original camera. Similarly, set screws 910 hold the lens 860 in place and allow it to be removed and replaced without changing its position or orientation.

This consistency, along with the consistent positioning of the mounting rod as discussed above, is exceptionally helpful in minimizing the computational requirements for processing the image data. Processing can be performed using techniques described in U.S. patent application Ser. No. 12/240,655, filed Sep. 29, 2008 (now U.S. Pat. No. 8,204, 340), entitled "Methods and apparatus for dot marker matching". The tolerance for maintaining the positions of each of the elements is to within portions of a millimeter. It is important to maintain the position and orientation of the cameras and mounting rods in order to keep the angle of view of the face from each camera the same, as well as to keep the angles between each of the cameras constant. Because the cameras remain in a known, fixed position, even after a replacement, it is easier to identify and correlate the makeup dots on the actor's face, and thus to process the images for the animation. Further, because the cameras are fixed relative to the face, they have a much higher effective resolution, yielding a better signal to noise ratio.

Also in FIGS. 8A-8D, cable 830 is shown connecting the camera 800 to the data logger (not shown). A front portion 850 of the camera 800 comprises a lens 860, which may be covered by a lens cap 870 for protection when not in use. Screws 840 secure the front portion 850 to the rear portion 880 of camera 800. In some embodiments, the camera 800 comprises a charge-coupled device ("CCD") element. The CCD element (not shown) is permanently secured within the rear portion 880 by a resin 890.

Advantages of the present invention include both the data processing aspects and the performance aspects of motion capture technology. The head-mounted camera system of the present invention captures images that show much greater detail about the movement of the face, which provides a greater effective resolution of the face for use in creating the final animation product. This greater detail is achieved in part because the cameras are able to maintain a close view of the face at all times, even when an actor's face would otherwise be blocked from view if using only the fixed cameras. The greater detail is also due in part to the larger number of markers that may be captured using the head-mounted camera system, versus the number that can be captured with previous systems.

In addition, because the head-mounted camera system captures the facial image data at the same time as the body capture, the system has the artistic advantages of prior simultaneous capture solutions while using manageable data capture and processing requirements. For example, an actor need not attempt to duplicate his performance precisely for separate captures of the face and the body. In addition, the placement of the cameras at the sides of the face allow for a less obstructed line of sight for the actor, which is preferred by actors and contributes to their comfort in performing using motion capture equipment. The placement also allows unobstructed access to the actor's mouth, which is helpful, for example, in scenes where the actor is expected to eat or drink.

While the exemplary embodiments have been described in some detail, by way of example and for clarity of understanding, those of skill in the art will recognize that a variety of modifications, adaptations, and changes may be employed. Hence, the scope of the present invention should be limited solely by the appended claims.

What is claimed is:

1. An external three-dimensional camera system comprising a plurality of head-mounted cameras configured to capture images of at least a portion of an actor's face from at least two different angles, wherein at least two head-mounted cameras of the plurality of head-mounted cameras are independently adjustable in position with respect to one another.

2. The external three-dimensional camera system of claim 1, wherein the plurality of head-mounted cameras comprises at least two cameras.

3. The external three-dimensional camera system of claim 1, wherein the plurality of head-mounted cameras are configured to capture images of the at least a portion of the actor's face from the at least two different angles at the same time or substantially at the same time.

4. The external three-dimensional camera system of claim 1, wherein the plurality of head-mounted cameras are configured to be fixed in position.

5. The external three-dimensional camera system of claim 1, further comprising a processor configured to process image data from the plurality of head-mounted cameras to produce three-dimensional image data of the actor's face.

6. The external three-dimensional camera system of claim 1, wherein the images include marker data.

7. The external three-dimensional camera system of claim 1, wherein the plurality of head-mounted cameras are micro-cameras.

8. The external three-dimensional camera system of claim 1, wherein the plurality of head-mounted cameras are configured to record grayscale images.

9. A motion capture camera system comprising:
a plurality of head-mounted cameras configured to capture images of at least a portion of an actor's face from at least two different angles, wherein at least two head-mounted cameras of the plurality of head-mounted cameras are independently adjustable in position with respect to one another;
a helmet that is adapted to be positioned on an actor's head;
a mounting bracket connected to the helmet, wherein the plurality of head-mounted cameras are positioned on the mounting bracket;
a processor connected to the head-mounted cameras; and
a transmitter connected to said processor.

10. The motion capture camera system of claim 9, wherein the plurality of head-mounted cameras comprises at least two cameras.

11. The motion capture camera system of claim 9, wherein the plurality of head-mounted cameras are configured to capture images of the at least a portion of the actor's face from the at least two different angles at the same time or substantially at the same time.

12. The motion capture camera system of claim 9, wherein the plurality of head-mounted cameras are configured to be fixed in position with respect to the mounting bracket.

13. The motion capture camera system of claim 9, wherein the transmitter is a wireless transmitter.

14. The motion capture camera system of claim 9, wherein the processor is configured to process image data from the plurality of head-mounted cameras to produce three-dimensional image data of the actor's face.

15. The motion capture camera system of claim 14, wherein the image data includes marker data.

16. The motion capture camera system of claim 14, further comprising a plurality of surface-mounted cameras configured to capture image data of an actor's body from the at least two different angles.

17. The motion capture camera system of claim 16, wherein the plurality of surface-mounted cameras are connected to the processor.

18. The motion capture camera system of claim 17, wherein the processor is configured to process image data from the plurality of surface-mounted cameras to produce three-dimensional image data of the actor's body.

19. A method of motion capture of an actor's face comprising:
placing marker dots on the actor's face;
positioning a head-mounted camera system on the actor's head, wherein the head-mounted camera system comprises a plurality of cameras;
configuring the plurality of cameras to capture image data of the actor's face from at least two different angles, wherein at least two head-mounted cameras of the plurality of head-mounted cameras are independently adjustable in position with respect to one another;
acquiring images of the actor's face;
transmitting the image data to a processor; and
processing the image data to obtain three-dimensional image data of the actor's face.

20. The method of motion capture of an actor's face of claim 19, wherein the captured image data includes marker data.

* * * * *